United States Patent
Fleischmann et al.

(10) Patent No.: US 9,507,515 B2
(45) Date of Patent: Nov. 29, 2016

(54) SYSTEM AND METHOD FOR DATA SELECTION BY MEANS OF A TOUCH-SENSITIVE SURFACE

(71) Applicant: ELEKTROBIT AUTOMOTIVE GmbH, Erlangen (DE)

(72) Inventors: Thomas Fleischmann, Erlangen (DE); Bernd Haberstumpf, Erlangen (DE)

(73) Assignee: ELEKTROBIT AUTOMOTIVE GmbH, Erlangen (DE)

( * ) Notice: Subject to any disclaimer, the term of this patent is extended or adjusted under 35 U.S.C. 154(b) by 160 days.

(21) Appl. No.: 14/267,186

(22) Filed: May 1, 2014

(65) Prior Publication Data
US 2014/0340335 A1    Nov. 20, 2014

(30) Foreign Application Priority Data
May 17, 2013   (DE) .................. 10 2013 009 009

(51) Int. Cl.
G06F 3/0484 (2013.01)
G06F 3/041 (2006.01)
G06F 3/0488 (2013.01)

(52) U.S. Cl.
CPC ....... G06F 3/04883 (2013.01); G06F 3/04842 (2013.01)

(58) Field of Classification Search
CPC ................. G06F 3/04883; G06F 3/04842
See application file for complete search history.

(56) References Cited

U.S. PATENT DOCUMENTS

| 7,705,830 | B2 | 4/2010 | Westerman et al. |
| 7,941,765 | B2* | 5/2011 | Fleck .................... G06F 3/0482 345/157 |
| 2010/0097332 | A1* | 4/2010 | Arthur ................ G06F 3/04847 345/173 |
| 2010/0251167 | A1 | 9/2010 | DeLuca et al. |
| 2011/0283188 | A1 | 11/2011 | Farrenkopf et al. |
| 2012/0306788 | A1* | 12/2012 | Chen .................. G06F 3/04883 345/173 |
| 2013/0044141 | A1* | 2/2013 | Markiewicz .......... G06F 3/0485 345/684 |
| 2013/0067383 | A1 | 3/2013 | Kataoka et al. |

FOREIGN PATENT DOCUMENTS

DE    102008051051 A1    3/2010

* cited by examiner

*Primary Examiner* — Andrew Sasinowski
(74) *Attorney, Agent, or Firm* — Westerman, Hattori, Daniels & Adrian, LLP

(57) ABSTRACT

A data selection system and a method for data selection by means of a touch-sensitive surface are disclosed. The method comprises sensing a first touch position on the touch-sensitive surface and tracking a movement from the first touch position to a second touch position. The method additionally comprises calculating at least one geometric parameter from the first touch position, the second touch position and a reference position, and effecting a data selection within a data range in dependence on the geometric parameter.

15 Claims, 4 Drawing Sheets

SYSTEM AND METHOD FOR DATA SELECTION BY MEANS OF A TOUCH-SENSITIVE SURFACE

TECHNICAL FIELD

The present disclosure relates to a computer-implemented method for data selection, and to a system for data selection. In particular, the present disclosure relates to effecting a data selection, by means of a touch-sensitive surface, by tracking a movement on the touch-sensitive surface.

BACKGROUND

Electronic devices offer a great variety of possibilities for selecting and inputting data. In the present disclosure, the term "datum" is used as the singular of data, unless a calendar date is explicitly described.

Usually, a datum is input by means of a keypad. For example, a particular field is selected on a graphical user interface by means of a cursor, and a datum is then input via the keypad. As an alternative to this, a combination field may be displayed, based on a list comprising data. The user calls up the list, usually by means of a cursor, and selects a datum from the list. The datum selected from the list is then displayed in the input field. The actual input is effected either directly, following selection from the list, or by means of a separate input command via a keypad input or graphical key operation. In such cases, selecting from a large data stock or data range is often time-consuming and inconvenient.

A further known data selection provides for selection of a datum in a predefined step width. For example, a data selection field may display a particular start datum. The latter may be numerical values, sequences of letters or, also, data predefined by a list. Two small keys, having upward and downward arrows, are displayed next to the data selection field. Clicking on one of these keys by means of a cursor causes the displayed datum to be incremented or decremented. In this case, the value, the sequence of letters or a list entry is incremented or decremented in a defined step width, for example by one.

The arrival of touch-sensitive surfaces such as, for example, touchscreens or mousepads, has also offered additional methods for data selection. The published document US 2011/0283188 A1 discloses a method for calendar date selection by means of a touch-sensitive screen. A selectable calendar date is displayed by a time strip. The user can touch the time strip on the screen, and slide it on the screen by moving the touch position. A bar displayed in the centre of the time strip marks the calendar date, which is behind the bar. A particular calendar date can thus be selected by sliding the time strip. The selected data is input by touching a key provided for this purpose.

In order to go from one calendar date to a distant calendar date, the user can change the displayed time intervals of the time strip. This is effected by touching the time strip with two fingers, and with a relative movement of the two touch positions of the two fingers. When the two fingers are drawn together, the view of the time strip changes from individual calendar days to calendar weeks. Bringing the fingers closer together causes the time strip to switch to calendar months, etc. If the two touch positions on the time strip are pushed apart, there is an inverse adjustment of the time strip (calendar month to calendar week to calendar day).

SUMMARY

The present disclosure is based on the object of providing a data selection method and data selection system that enable data to be selected in a space saving manner, while also allowing simple and rapid operation.

According to one aspect, a computer-implemented method for data selection by means of a touch-sensitive surface is disclosed. The method comprises sensing a first touch position on the touch-sensitive surface and tracking a movement from the first touch position to a second touch position. Furthermore, the method comprises calculating at least one geometric parameter from the first touch position, the second touch position and a reference position, and effecting a data selection within a data range in dependence on the geometric parameter.

The calculating of the at least one geometric parameter may comprise calculating at least one distance measure between the first touch position and the second touch position, taking account of the reference position.

As an alternative or in addition to this, the calculating of the at least one geometric parameter may comprise calculating at least one geometric quantity of a circle sector or of an element thereof. In this case, the reference position is, for example, a mid-point of the circle sector.

Likewise as an alternative or in addition to this, the at least one distance measure comprises at least one of the following: an angle between two connecting lines, of which a first runs from the reference position to the first touch position, and a second runs from the reference position to the second touch position, and an arc length between the first touch position and the second touch position, the reference position being a mid-point of an arc on which the arc length is based. For this, the data selection may be effected in dependence on the angle and/or the arc length.

As an alternative to this, the distance measure may also be calculated as a distance between the first and the second touch position, as a path length of the tracked movement, as an arc length of an elliptical arc between the first and the second touch position, or as an angle of an arc segment between the first and the second touch position, the reference position representing a reference point, e.g. a mid-point, at least for the elliptical arc and the arc segment.

In a variant, the calculating of the at least one geometric parameter may comprise at least one of the following: calculating a radius belonging to the circle sector, the radius being a length of one of two connecting lines, of which a first runs from the reference position to the first touch position, and a second runs from the reference position to the second touch position, calculating the radius belonging to the circle sector from the in any manner averaged length of the first and the second connecting line, calculating an angle between the first and the second connecting line, calculating a length of a chord in the circle sector between the first and the second touch position, and calculating an arc length of the circle sector between the first touch position and the second touch position.

In a further variant, the effecting of the data selection comprises determining whether the angle between the two connecting lines has a positive or a negative value, and/or determining a movement direction on the chord from the first to the second touch position, and/or determining a direction of rotation of the arc length between the first and the second touch position. In this case, the effecting of the data selection may be performed in dependence on the positive or negative value of the angle, and/or on the direction of the chord, and/or on the direction of rotation of the arc length.

As an alternative or in addition to this, the calculating of the at least one geometric parameter may comprise calculating a first distance from the reference position to the first touch position, and a second distance from the reference position to the second touch position, and calculating a relationship between the first distance and the second distance.

Optionally for this, the method may comprise setting a step width in dependence on the calculated relationship of the first distance and the second distance. In this case, the data selection is effected with the set step width being taken into account.

In addition, the calculating of the relationship may comprise calculating a difference between the first distance and the second distance. Alternatively, a ratio of the first distance to the second distance may be calculated as the relationship. In both cases, the setting of the step width may comprise determining whether the difference of the distances produces a positive or a negative value, and changing the step width in dependence on the positive or negative value of the difference.

As an alternative or in addition to this, the setting of a step width may comprise at least one further geometric parameter. Such a geometric parameter results from an acceleration of the touch during the tracking of the movement from the first touch position to the second touch position.

Moreover, as an alternative or in addition to this, the tracking of the movement and the calculating of the geometric parameter may be performed at predefined time intervals. In this case, the method additionally comprises determining a difference between a currently calculated geometric parameter and a previously calculated geometric parameter, and comparing the difference with a threshold value. The data selection is then performed only if the difference exceeds the threshold value.

Likewise as an alternative or in addition to this, the method may comprise: determining the reference position by determining a fixed point in respect of the first touch position and/or the second touch position, determining a fixed point in respect of an object represented on a graphical user interface, determining a third touch position on the touch-sensitive surface, and/or determining a movement mid-point, around which the tracked movement has its course.

The reference position may therefore be a point that is fixed (e.g. by the system) on the touch-sensitive surface. However, the reference position may also be fixed by the user himself by touching a particular point. This further touch may be effected, for example, by a second finger. Alternatively, the tracked movement may be used to determine a movement mid-point. For this, a circle sector that is closest to the tracked movement may be determined. The mid-point of this circle sector corresponds to the reference position.

In addition, the reference position may be located in an input field for data input. Alternatively, the user may also touch an input field and thereby, by means of the third touch position, put the reference position into the input field or set it within the input field. Alternatively or additionally, a predefined fixed point may be determined in respect of the input field when an input field is touched.

Likewise as an alternative or in addition to this, the sensing of the first touch position and the tracking of the movement may be limited to an area of an arc segment displayed on a graphical user interface. For example, an arc segment may be displayed on the display device in respect of an input field. It is thereby indicated to the user that the touch and movement for data selection are to be executed within this arc segment.

Moreover, as an alternative or in addition to this, the reference position may be a third touch position. The method may then comprise tracking a movement of the touch at the third touch position to a fourth touch position, while the touch at the second touch position remains stationary. The method may additionally comprise: calculating at least one further geometric parameter from the third touch position, the fourth touch position and the second touch position, as a new reference position, and effecting a further data selection within a data range in dependence on the further geometric parameter.

The data selection of the method may comprise displaying a start datum, changing the start datum in dependence on the geometric parameter, and displaying the changed start datum.

The data selected by means of the above method may be, for example, numbers, letters, words and/or calendar data. These data may also be provided in predefined lists. For example, a place name, street name, post code and/or house number may be selected. Likewise, telephone numbers may be selected from a list containing telephone numbers such as, for example, a telephone directory or contact list. It is to be understood that a list may also be based on calendar dates, such as, for example, appointed dates.

According to a further aspect, a computer program product is disclosed, having program code for performing the method when the computer program product is executed on a computer device. The computer program product may be stored on a computer-readable recording medium.

Another aspect of the disclosure relates to a system for data selection. The system comprises a touch-sensitive surface and a processor system. The processor system may be configured to execute the above method.

In one implementation, the system comprises a display device, which is configured to display the datum or data, an input field for the datum or data, an arc segment, and/or a display field of a set step width.

In addition, the display device may highlight a touch position. Alternatively or additionally, the tracked movement may be displayed, in the form of a movement trace, by the display device. Likewise, the display device may also identify the reference position, if the latter is located within the display area of the display device.

In another implementation, the display device and the touch-sensitive surface are integrated in a touch-sensitive screen (touchscreen).

BRIEF DESCRIPTION OF THE DRAWINGS

Further aspects, advantages and details of the present disclosure are given by the following description of the exemplary embodiments, in conjunction with the figures, wherein.

DETAILED DESCRIPTION

The present disclosure is explained with reference to schematic flow diagrams and block diagrams. The technology on which these diagrams are based may be implemented both in hardware and in software, or in a combination of hardware and software. This also includes digital signal processors (DSP), application-specific integrated circuits (ASIC) and other functional or computing components.

Figure 1:
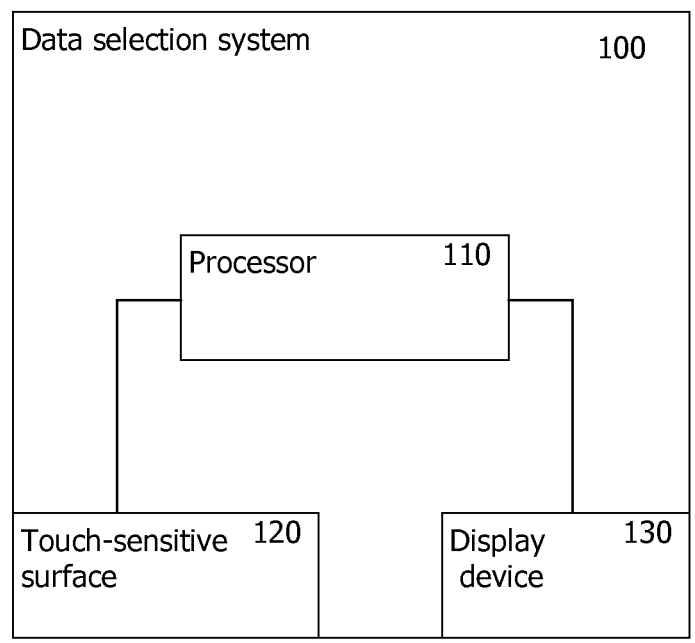
FIG. 1 shows a block diagram of an exemplary embodiment of a selection system.

According to one exemplary embodiment, the present disclosure relates to a data selection system, which is shown schematically in a block diagram represented in FIG. 1.

The data selection system 100 shown comprises a processor system 110 and a touch-sensitive surface 120. The processor system 110 is configured to execute a simple and user-friendly data selection method or process, or defined steps thereof. The processor system 110 is able to receive signals and/or data from the touch-sensitive surface 120. For this purpose, the processor system 110 is coupled to the touch-sensitive surface 120 via a bus or other data line.

The data selection system 100 additionally comprises an output 130. This output may be realized by a screen or a display device 130. In order to transmit data or signals to the display device 130 for the purpose of displaying information, the processor system 110 is also coupled to the display device 130 via a bus or other data line.

The touch-sensitive surface 120 may be a touch-sensitive surface for controlling a cursor. Such a surface is also known as a touchpad. The cursor in this case is displayed on the display device 130. Combinations of a touchpad 120 and a display device 130 are known, for example, in the case of laptop computers or netbooks. However, a touchpad 120 may also be an independent device, which is connected to a computer.

In a particularly advantageous implementation, the touch-sensitive surface 120 is integrated with the display device 130, and constitutes a so-called touchscreen. Such a touch-sensitive surface 120 may also be part of a processor-controlled device such as, for example, a PC, tablet PC, smartphone, PDA (personal digital assistant), a portable or vehicle-integrated navigation system or vehicle input system.

The touch-sensitive surface 120 can output, for example, signals and/or data that represent the position of one or more touches on the surface 120. These signals and/or data may represent coordinate values in a coordinate system that is specific to the surface 120. Alternatively, the signals and/or data represent coordinate values in a coordinate system that is specific to the display device 130. Likewise alternatively, they may also relate to a coordinate system in a displayed window of a graphical user interface. In addition, the touch-sensitive surface 120 can output these data and/or signals at defined time intervals. These intervals may be from a few seconds to one second. Preferably, however, a data and/or signal output is effected several times per second (e.g. once, twice, five times per second, etc., or with a frequency of 1, 5, 10, 30, 60 Hz, etc.).

The touch-sensitive surface 120 and the processor system 110 are used to select or, also, input data. For this purpose, the processor system 110 is able to sense one or more touch positions on the basis of the received signals and/or data.

In this case, the entire region of the touch-sensitive surface can be used for data selection. The user is not reliant upon input fields, lists or small keys for value alteration. In particular, in the case of the touch-sensitive surface used with one finger, the present disclosure offers the possibility of very simple, easily operated data selection. For example, the user does not need to move a cursor by having a finger on, in some cases, very small selection keys of combination fields or list fields. When a touchscreen is used, these selection keys are also generally covered by the finger, rendering selection more difficult.

Figure 2:
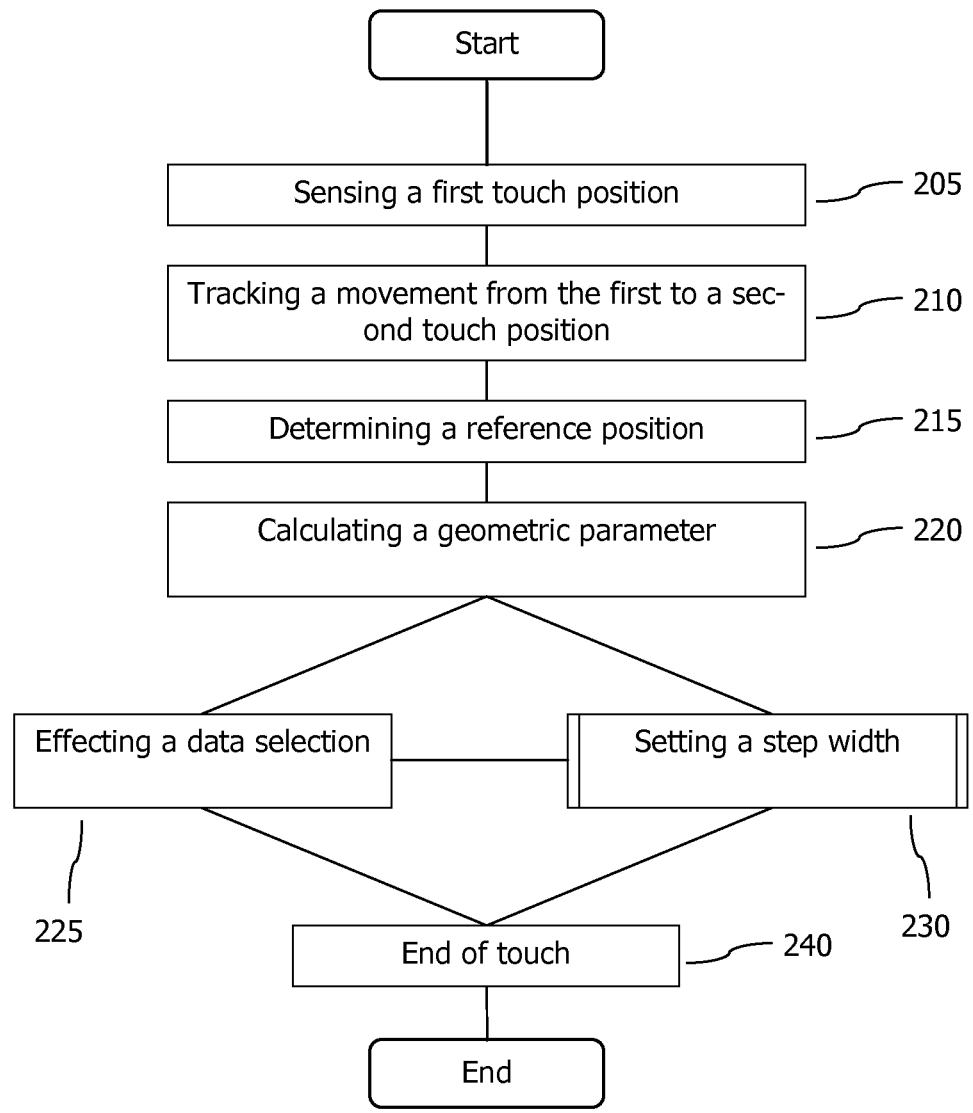
FIG. 2 represents a flow diagram of an exemplary embodiment of a process for data selection.

The interaction of the touch-sensitive surface 120 and the processor system 110 is now explained in greater detail in conjunction with FIG. 2. The latter shows a flow diagram of an exemplary embodiment of a process for data selection.

The process for data selection commences in step 205, with the sensing of a first touch position. The first touch position is located on the touch-sensitive surface 120. The first touch position can be indicated on the display device 130, such as, for example, a screen, by a cursor. In the case of a touchscreen, the touch can likewise be identified by a cursor. This is not necessary, however, since the touch position may be covered. For example, the touch may be effected by means of a finger or a pen, a so-called touchpen or stylus.

In a further process step 210, a movement of the first touch position is tracked to a second touch position. For this purpose, the touch position is sensed, or determined, at defined time intervals. In standard touch-sensitive surfaces, the sensing of a touch is usually effected several times per second. The sensing of the touch and the tracking of the movement can also be effected by the processor system 110. For this purpose, the processor system 110 accesses signals from the touch-sensitive surface 120. Thus, a movement of the touch, from the first touch position to a different touch position, can be tracked easily.

In addition, the processor system 110 determines a reference position (step 215). This step may also be effected before step 210. The reference position may be determined in a variety of ways. This, and the tracking of a movement, is now explained in greater detail in conjunction with FIG. 3A.

Figure 3A:
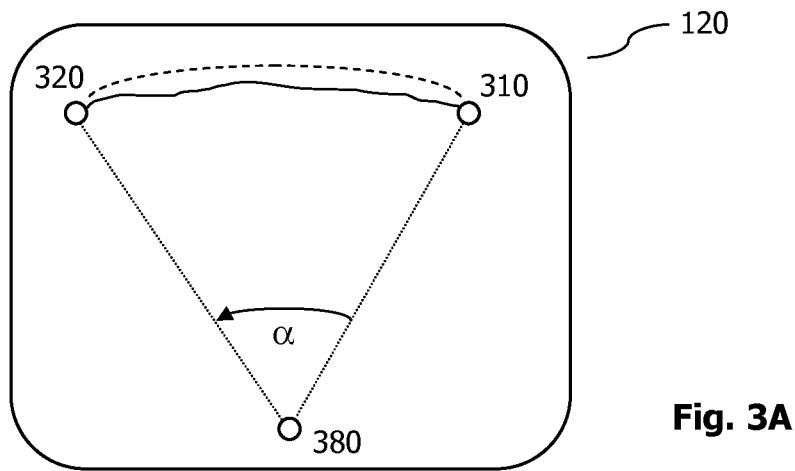
FIG. 3A and FIG. 3B show schematic representations of touch positions and the course of a movement of the touch positions, according to two exemplary embodiments.

FIG. 3A shows a schematic view of a touch-sensitive surface 120. Also represented in FIG. 3A are a first touch position 310 and a second touch position 320. The unbroken line between the first and the second touch position (310, 320) shows a course of movement that was tracked, or sensed, in step 210 (FIG. 2). A movement and a touch position are not necessarily distinguishable. As mentioned above, a touch on the surface 120 is sensed by the processor system 110 at a high frequency, e.g. several times per second or once per second. A series arrangement of such sensed touch positions represents a movement. By means of a threshold value, the processor system 110 can ascertain whether a movement has occurred. For this purpose, the distance of two successive sensed touch positions is compared with the threshold value. If the distance is greater than the threshold value, a movement is to be assumed, which can be tracked. Otherwise, an unintentional movement is assumed, such as, for example, unintentional shaking or trembling.

The tracking of a movement is the storage of successive touch positions. For example, coordinate values can be stored. These may be coordinates transmitted by the touch-sensitive surface 120. Alternatively, they may also be relative coordinates, which relate to the first touch position. The tracking of a movement also comprises the evaluation of movement data such as, for example, the coordinate values, and verification of whether the movement ends. For example, successive touch positions overlap each other, or lie within the above-mentioned threshold-value distance. Thus, at the end of a movement, a second touch position can be sensed. Alternatively, each of the successive touch positions within a movement is a second touch position in the sense of the present disclosure. The movement itself would then be the path between two successive touch positions.

A reference position 380 is determined by determination of a fixed point in respect of the first touch position 310 and/or the second touch position 320. For example, the reference position 380 may be fixed by the system as a defined point on the touch-sensitive surface 120. A reference position 380 may also be fixed on the display device 130 by the system, in particular if the display device 130 and the touch-sensitive surface 120 are separate components. In addition, the reference position 380 may be graphically displayed on the display device 130, but this is not always necessary.

If the first touch position 310 is located in the upper region of the touch-sensitive surface 120, as represented in FIG. 3A, the reference position 380 is fixed in the lower region of the touch-sensitive surface 120. This offers the advantage that the user has the entire upper region of the touch-sensitive surface 120 available for a movement. Moreover, a distance between a first touch position 310 and the reference position 380 should be selected so as to be as great as possible. This enables the movement around the reference position 380 to be easily sensed. It is to be understood that any other alignment between touch positions and a reference position (right side, left side, etc.) may be selected in respect of the touch-sensitive surface 120.

Alternatively or additionally, the reference position 380 may also be a third touch position on the touch-sensitive surface 120. For example, the user may touch the touch-sensitive surface 120 at two differing, separated positions by means of two fingers, two objects or one finger and one object (e.g. a pen). Such a touch and movement can be performed particularly easily with the thumb placed on the reference position 380 and another finger of the same hand on the touch position 310. The user can thereby easily execute a rotary movement around the thumb, using the other finger.

In addition to the implementation possibilities for determining the reference position 380 that have been mentioned hitherto, the latter may also be a fixed point in respect of an object represented on the graphical user interface. For example, an input field or data selection field may be displayed, the reference position 380 being located on, in or around this field. If the display device 130 shows a field in which a particular value, letter, name, etc. is to be selected, the processor system 110 can insert the reference position 380 therein, or can create a defined relationship between the latter and said field. Subsequently, it is necessary only for the user to touch a position on the touch-sensitive surface 120 that is outside of the input field or data selection field, and to execute a movement there.

For example, the user may use a first finger or object to touch a region of the touch-sensitive surface 120 that corresponds to the data selection field or input field, and use a second finger or object to effect a further touch. These touches may be effected in succession. Alternatively, the field may be touched first, and the movement then effected. In both cases, the reference position 380 is placed on a position, in or around the input field or data selection field, that corresponds to the touch made with the first finger or object. In this case, a defined fixed point may also be set in the field as a reference position 380, after a touch inside the field has been sensed. For example, a corner of the field, a point on an edge, or the centre of the field could serve as a fixed point.

In a further implementation possibility, the reference position 380 can also be determined, by the system, as a movement mid-point, around which the tracked movement has its course. As shown in FIG. 3A, it is possible to locate a circle segment (represented by a broken line) between the first touch position 310, the second touch position 320 and the tracked movement. The mid-point belonging to this circle segment then represents the reference position 380. For determination of the circle segment, the radius of the circle segment may be selected such that the mid-point is located within the touch-sensitive surface 120. Alternatively, the mid-point may also be located outside of the touch-sensitive surface 120. A greater distance between a touch position (310, 320) and the reference position 380 allows the movement around the reference position 380 to be more easily identified, or sensed.

Alternatively or additionally, the reference position 380 may also be located at a particular position relative to the dimensions of the touch-sensitive surface 120 and/or of the display device 130. For example, the reference position 380 may be located on a point on a boundary, or periphery, of the touch-sensitive surface 120 or of the display device 130. It is to be understood that the reference position is not restricted to the touch-sensitive surface 120 or to the display device 130. The present disclosure can be applied to displayed windows—i.e. parts of a graphical user interface—and boundaries thereof.

With reference to FIG. 2, in step 220 a geometric parameter is next calculated from the first touch position 310, the second touch position 320 and the reference position 380. The calculation of a geometric parameter may comprise the calculation of at least one distance measure between the first touch position and the second touch position, taking account of the reference position.

The distance measure is, for example, an angle between two connecting lines, of which a first runs from the reference position to the first touch position, and a second runs from the reference position to the second touch position, or it is an arc length between the first touch position and the second touch position, or a combination thereof. The reference position in this case is a mid-point of an arc on which the arc length is based.

As an alternative or in addition to this, the calculation of a geometric parameter may comprise calculating at least one geometric quantity of a sector of a circle. In this case, the reference position is determined as the mid-point of the sector. The first and second touch positions each define a point on the associated circle.

As an alternative to this, it is also possible to calculate a distance measure or a geometric quantity of another geometric form such as, for example, an ellipse sector, clothoid sector or, also, rectangle sector. In all cases, the reference position 380 is a mid-point, centre or other reference point of the geometric form around which a movement is effected along the boundary of the geometric form. A round movement course has the advantage that, overall, there is a longer distance available for data selection on the touch-sensitive surface 120. The method of the present disclosure is described in the following on the basis of a circle sector. Persons skilled in the art are aware of how the teaching of the present disclosure may be implemented with other geometric forms.

To avoid repetitions for these other geometric forms, what is described in the following is based only on a circle, a circle segment or a circle sector. A possible distance measure, or a possible geometric quantity, of the circle sector is a radius, the radius being a length of one of two connecting lines, of which a first runs from the reference position 380 to the first touch position 310, and a second runs from the reference position 380 to the second touch position 320. In other words, a first radius to the first touch position 310, and a second radius to the second touch position 320, are calculated from the reference position 380. Of these, one is selected, which represents the radius of the circle sector. For example, the smaller or the larger radius is selected. Alternatively, a radius for the circular sector is determined from the first and the second radius.

If the reference position 380 is determined as a movement mid-point of the first and second touch positions, the radius is freely selectable. For example, the radius may be defined such that the reference position is located on the touch-sensitive surface 120. It may also be selected such that it is located on a symmetry axis of the touch-sensitive surface 120. It is to be understood that other locations of the reference position 380 are also possible, related or unrelated to the touch-sensitive surface 120.

A further geometric quantity is an angle between the first and the second radius, i.e. an angle of a rotation about the reference position 380, from the first touch position 310 to the second touch position 320. This angle also serves as a geometric parameter, and is represented as an angle $\alpha$ in FIG. 3A. The angle $\alpha$ can be easily determined for all variants of the reference position 380 described above.

The representation of FIG. 3A shows a comparatively large angle $\alpha$. This is primarily to aid comprehension. As mentioned above, the second touch position 320 may represent an end of a movement. Thus, in the case of FIG. 3A, the user has touched the touch-sensitive surface 120 at the position 310, then moved the finger or object along the unbroken line, and stopped at the position 320. It is only when the movement "stops" that the geometric parameter is calculated. For example, as described above, a threshold value can be used to determine whether a movement occurs or whether the touch position is stationary on the touch-sensitive surface 120.

Alternatively, a movement of the touch position (310, 320) is sensed very frequently, and also during a movement of the finger or object. Consequently, upon each sensing, there will only be a small distance between the touch positions, and the angle $\alpha$ will therefore also be small. The geometric parameter is thus also calculated after each sensed movement.

Instead of an angle, or also in addition to the latter, it is also possible to determine a chord, from the first to the second touch position, in dependence on the reference position. This corresponds to calculating a side length of a rectangle, if no geometric quantities of a circle are calculated. In this case, the first and second touch positions each represent a corner of the rectangle. The reference position is then the centre, or mid-point, of the rectangle. The length of the chord, or rectangle, may be selected as a geometric quantity. In addition, a direction of the chord, or of the rectangle side, may also be determined. This is determined by the reference position 380, the first touch position 310 and the second touch position 320. For example, it is set in the clockwise (or anti-clockwise) direction.

Alternatively or additionally, an arc length is calculated between the first touch position 310 and the second touch position 320, the reference position 380 representing an arc mid-point. This implementation possibility is advantageous if the reference position 380 is a fixed point relative to the touch-sensitive surface 120 or the display device 130.

Next, in step 225 (FIG. 2), a data selection is effected within a data range. In this case, all geometric quantities described above may be used as a geometric parameter. Alternatively, the geometric quantities may be used for determining the arc segment, and a geometric parameter is calculated or derived from the latter. The data selection is effected in dependence on the geometric parameter.

For data selection, the display device 130 is designed to display data, a single datum and/or a data selection field. The processor system 110 transmits data and/or signals to the output 130, in order to change a displayed graphical user interface. For example, at defined time intervals, the movement of a first touch position 310 to a second touch position 320 can be tracked, the geometric parameter for this can be calculated, and a corresponding data selection can be displayed on the display device 130. The user thus has a direct visual feedback of his data selection.

In one implementation of the present disclosure, a start datum is displayed for the data selection. The start datum is then changed in dependence on the calculated geometric parameter, and the changed start datum is displayed.

As described above, the geometric parameter may be an angle between two radii or lines. In this case, the data selection is effected in dependence on the calculated angle. If the movement is performed, for example, in the anti-clockwise direction (as shown in FIG. 3A), a positive value can be assumed for the angle. If, on the other hand, the movement were effected in the clockwise direction from the first touch position, a negative value would be taken for the angle. It is to be understood that the present disclosure is not limited to this calculation of positive and negative angle values. For example, for left-handed persons, it may be easier to effect the first touch position in the left region of the touch-sensitive surface 120, and to move in the clockwise direction. The preferred, or more easily performed, movement should then correspond to a positive angle value.

Thus, if a positive angle $\alpha$ is calculated in step 220, a start datum is incremented. In the case of a negative angle, the start datum is decremented. If the data selection relates to numerical values, the latter can be incremented according to the calculated angle. If a negative value has been calculated, on the other hand, the numerical value is decremented.

The change in the datum can be displayed while the movement from the first touch position to the second touch position is occurring. For this purpose, the movement is tracked at predefined time intervals, and the geometric parameter is calculated. More precisely, the second touch position is determined after each time interval, such that the geometric parameter can also be calculated after each time interval.

It is to be understood that the data selection may also be effected on the basis of a calculated arc length or a calculated chord length between a first touch position 310 and a second touch position 320. In this case, a direction of rotation or a coordinate system can be used to determine whether a positive or a negative value is to be defined for the arc length, or the distance. For example, an arc length in the anti-clockwise direction is a positive value, and an arc length in the clockwise direction is a negative value.

This process makes it easier for the user to select data. In comparison with existing selection methods, the user can select data through a simple movement of a touch position around a reference position. There is no need to display an area-intensive list or time strip. Likewise, there is no need to display and click on small selection keys. If the user uses two fingers for the process disclosed in this document, the user can place the reference position 380 in or close to an input field for particular data, while selecting the data in the field by using the other finger. Thus, control of the field in which data are selected, and the data selection itself, are effected solely by a two-finger touch.

The selection of the data in this case is not limited to numerical values, but may likewise also include letters, words, calendar dates, etc. For example, a word may be input on a display, in which the reference position 380 is fixed at a first letter position (either automatically by the processor system 110 or by touch at this location). By moving around this position, the user can go through the alphabet, until he reaches a desired letter.

It is likewise conceivable for the data selection to be based on already defined words. If the present method is used in a navigation system, these data may be, for example, countries, towns or streets. By moving around a reference position, particular countries, towns or streets can then be selected from the underlying lists. The display may show corresponding data during the movement, such that the user obtains a visual feedback of the already changed data (from the list). Obviously, this can also be effected for telephone numbers, contacts, calendar dates, etc.

The actual selection or confirmation of the data may be effected either via an input key or by releasing the touch-sensitive surface, i.e. ending the touch. Ending of the touch may relate both to the moving touch and to the reference position touch, or both.

In a further implementation of the present disclosure, the user may also set a step width, in step 230 (FIG. 2). For this purpose, a relationship is calculated between a first radius, from the reference position 380 to the first touch position 310, and a second radius, from the reference position 380 to the second touch position 320. A step width can be set 230 in dependence on the calculated relationship of the first radius and the second radius. The set step width is then taken into account in the data selection.

If, instead of being based on a circle sector, the process is based on another geometric form, radii need not be calculated. A relationship is then established for the distances between the reference position 380 and a first and a second touch position (310, 320), respectively.

Figure 3B:
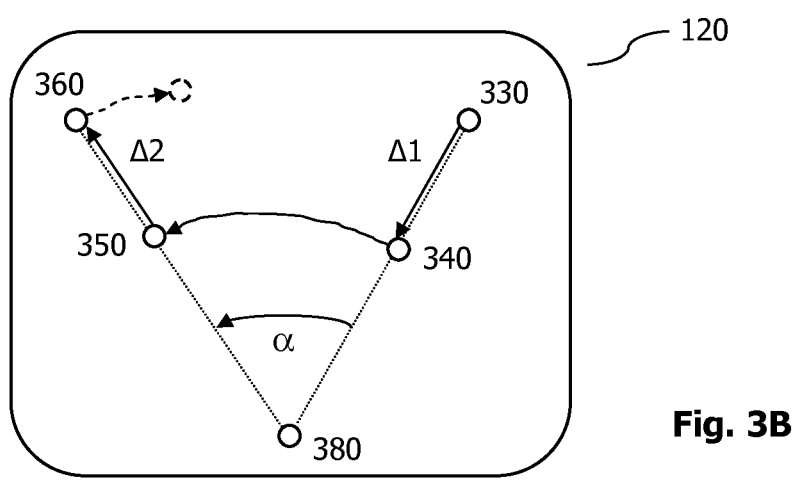

The setting of a step width is now explained on the basis of FIG. 3B. FIG. 3B shows a schematic view of the touch-sensitive surface 120. Here also, as in FIG. 3A, a first touch position 330 is sensed on the touch-sensitive surface 120. In this example, a second touch position 340 is located approximately on a radius from a reference position 380 to the first touch position 330. A relationship between the radii of the first and the second touch position in respect of the reference position 380 is used to determine a step width.

For example, the distance between the first touch position 330 and the second touch position 340 (denoted by Δ1 in FIG. 3B) may be used for this. For this purpose, it is determined whether the distance Δ1 has a positive or a negative value. This is effected by calculating the difference of the first radius, from the reference position 380 to the first touch position, and the second radius, from the reference position 380 to the second touch position 340. As in the present case of FIG. 3B, the resultant difference is a positive value. If the second touch position 340 were further distant from the reference position 380 than the first touch position 330, a negative value would be obtained for Δ1.

The step width for data selection is altered in dependence on the positive or negative value of the difference (Δ1). It is advantageous if a positive difference (Δ1) increases the step width. This is because, in this case, the radius for a further movement is shortened. This has the result that only a "rougher" data selection is possible, since the angle of a movement now changes more rapidly.

As an alternative to calculation of a difference, a ratio may be calculated, between a first radius and a second radius. Depending on whether this ratio is above or below the value 1, the step width is increased or reduced. In order for the calculated ratios to be evaluated equally, in each case the radius from the reference position to a touch position is divided by the radius from the reference position to a subsequent touch position. In the case of the positions 330 and 340 in FIG. 3B, this gives a ratio of greater than one.

If numerical values are selected and in the case of a positive difference, the step width can be changed from units ("ones") to tens, hundreds, etc. In the case of a negative difference, the step width would be reduced in hundreds, tens, units ("ones"), etc. If, on the other hand, time values or calendar dates constitute the basis, the step width changes from seconds to minutes to hours, etc., or from days to weeks to months, etc.

As represented in FIG. 3B, the touch is continued, and reaches the third touch position 350. Since an angle α is produced, in respect of the reference position 380, between the touch positions 340 and 350, the data are selected according to the geometric parameters, in this case the angle α and Δ1.

In a further movement step, the movement may be continued to the fourth touch position 360. As shown in FIG. 3B, this results in a negative difference Δ2 of the radii, from the reference position 380 to the touch position 350 and from the reference position 380 to the touch position 360. Accordingly, the step width is reduced again, on the basis of the negative difference Δ2. Alternatively, in this case also, the ratio of the radii may be considered. In this case, a value of less than one is obtained. A further movement may then be pursued, as indicated by broken lines in FIG. 3B.

It is to be understood that the user need not follow precisely the described sequence of touch and movement. The user may also effect an "oblique" movement. A plurality of geometric parameters can thus be calculated simultaneously, and both data selection and setting of the step width can be performed. The two values, or settings, can be calculated after each time interval at which a new touch position is sensed.

It is likewise part of the present disclosure that the movements be optimised by the use of a threshold value. It can be ascertained, for example, whether a movement to the reference position 380 or away from it (see Δ1 and Δ2 in FIG. 3B) exceeds a particular threshold value. The step width is adjusted only in the case of a movement greater than the threshold value. This assists the user, since he does not have to move exactly along an arc or a straight line. The same may also be the case for data selection, if the user actually only wants to change the step width. In this case, it can be determined, by means of one or more threshold values, whether the movement is leading substantially towards the reference position or away from it. For example, the calculated geometric parameter can be compared with a threshold value. If the threshold value is exceeded, the data selection or the adjustment of the step width is performed.

If an adjustment of the step width is determined and performed, the processor system 110 may optionally display corresponding information on the display device 130. The user thus obtains a visual feedback concerning the set step width. Alternatively or additionally, an acoustic or haptic feedback may also be generated.

The data selection process of the present disclosure, and in particular the steps 220, 225, and optionally also 230, are performed until the user ends the touch (step 240). If the user performs the touch using two fingers, it is possible to end the process only when both fingers have been removed from the touch-sensitive surface 120. The user is thus able to maintain the reference position touch and to reach back with the finger for data selection (movement). This is advantageous if a boundary of the touch-sensitive surface 120 has been reached or the user cannot effect further turning with the finger. It is thus possible to effect data selection until the desired datum has been reached.

Alternatively, the user is also able to adjust, or set, the step width, reach back and effect the data selection by means of a movement. In this case, the movement need not be performed with a smaller (or larger) radius for differing step widths. Instead, approximately the same radius can be used for data selection in each case. For this, a distinction is made only between movements along a radius and those along an arc segment or chord.

The inputting of the selected data can also be effected upon ending of the touch. This is particularly advantageous if the user places the reference position in an input field by means of a touch. As soon as this touch is ended, the selected data can be input, for example stored or processed further. Alternatively, this may also be effected by a separate input. For this purpose, the user may operate an input key on the keypad or by means of a cursor on the display.

Figure 4A:
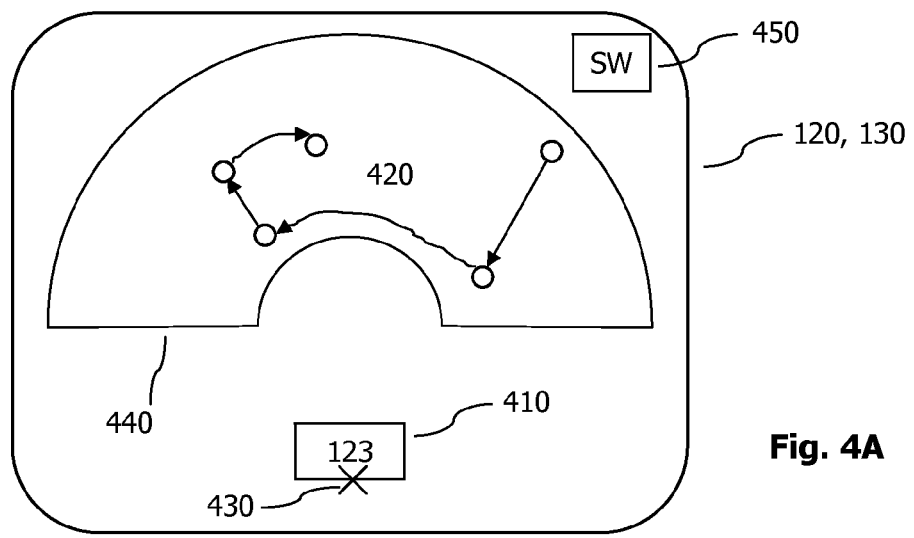
FIG. 4A shows a schematic representation of a course of movement, according to a further exemplary embodiment.
Figure 4B:
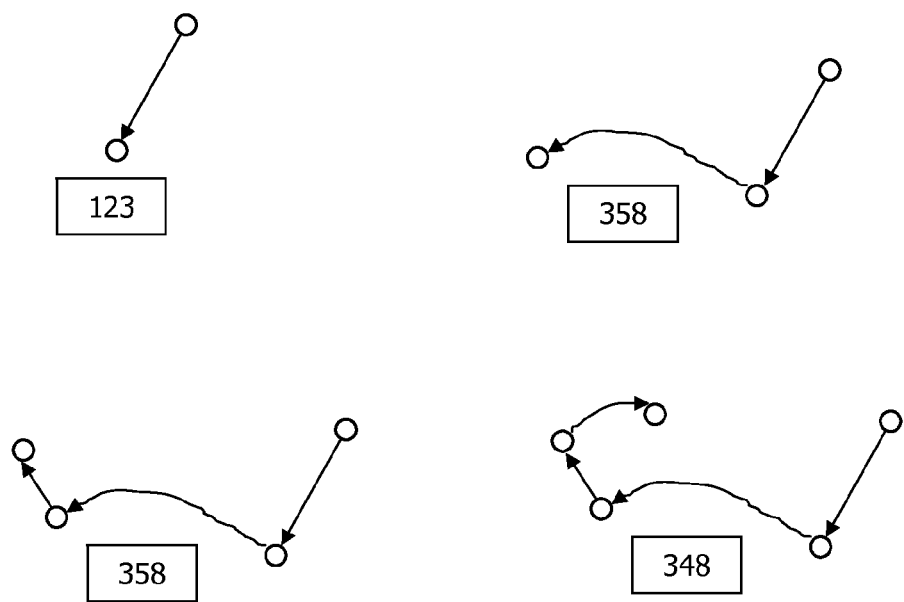
FIG. 4B shows schematic views of courses of movements and associated data selection, according to further exemplary embodiments.

The data selection process of the present disclosure is now described on the basis of a detailed example of a number selection, with reference to FIGS. 4A and 4B. FIG. 4A shows a schematic view of a touch-sensitive surface 120. Also shown is a data selection field 410. This data selection field 410 can be used to define a particular value. However, the field may also be empty, or have the value zero.

Additionally represented is a field 450 for displaying the current step width. In the case of data selection of numerical values, this may indicate the numerical value of the step width (e.g. 0.1; 0.5; 1; 2; 5; 10; 100; etc.). In the case of letters, the letter position in the word to be selected may be displayed as a number. Alternatively, the number of the letters jumped in each step may also be displayed.

As an alternative or in addition to the field 450, the step width may also be identified in the data selection field 410 itself. For example, if tens are changed, in the case of numbers, or if the third letter in a word is changed, this number or letter can be highlighted in the field 410. This can be effected by a different lettering colour or background colour of the corresponding position, in comparison with the other positions in the number or word.

FIG. 4A shows a particular movement sequence 420. As already explained above in relation to FIGS. 3A and 3B, a reference position 430 is also determined. The reference position 430 may be defined by the system, for example at a lower edge of the data selection field 410. Alternatively, the user may touch the location 430, for example using a thumb, and thus define the reference position 430.

FIG. 4B shows, in schematic form, the portions of the movement course and the associated numerical values that are displayed in the data selection field 410 after the respective portion. The view shown on the top left in FIG. 4B represents a first movement, in the direction of the reference position 430. It is then assumed that no rotary movement is effected around the reference position 430. Since the movement is effected on a line, no angle or length of a chord or arc length can be calculated. As described above, the geometric parameter may also be below a threshold value, and is therefore not taken into account. The displayed value in the data selection field thus remains the same (here, 123). Owing to the movement in the direction of the reference position 430, however, the step width for data selection has been increased. In this case, the step width may be adjusted per millimeter, centimeter or, also, per pixel of the movement. It is to be understood that other units are also possible for determining the step widths. For example, the step width may be increased from 1 to 5, 10, 15, 20, etc. It is to be understood that any other step width may be selected.

In the next portion of the movement course (shown on the top right in FIG. 4B), a movement to the left is executed. Since the movement does not significantly alter the distance in relation to the reference position 430 (by exceeding a threshold value), the step width remains. Owing to the movement to the left, a positive geometric parameter can be calculated. For example, a positive angle can be calculated, between the two touch positions and the reference position 430. The value is changed in accordance with this angle and the previously set step width. In the present case, a higher step width has been set, such that the value rises very rapidly (in this case, from 123 to 358) because of the distance over which the movement has been effected. Alternatively, the movement may also be effected along a chord (idealised on the basis of a threshold value). If the process is based on this, it is necessary to make a greater distinction between movements from and to the reference position. In the case of a chord, there is also an approach towards the reference position. The distinction can be made by selection of correspondingly large threshold values.

In the movement course represented on the bottom left in FIG. 4B, a movement is effected that goes away from the reference position 430. Here, likewise, the ideal case has also been assumed, that the movement has a course virtually on a radius through the reference position 430. The displayed value (358) therefore remains unchanged. However, owing to the greater distance in relation to the reference position 430, the step width is now reduced again. For example, the step width may be set to the value 2.

The fourth movement sequence, which is represented on the bottom right in FIG. 4B, is a movement to the right, or in the clockwise direction. Owing to the fact that a smaller step width has been set, a data selection is effected for the value 348.

As is evident from the above description, the input method of the present disclosure is very easy for the user to perform. Because of the possibility to set a step width, the user can very rapidly reach a desired datum.

Instead of numerical values, it is also possible to select letters, words and other elements. In the case of words (such as, for example, countries, names of towns or streets), the user can select a datum from a predefined list by effecting a rotation about the reference position. In the case of a "normal step width", there is then in each case a jump to the next datum of the list when a movement around the reference position is effected. However, if the user reduces the distance in relation to the reference position, i.e. increases the step width, a jump can be effected to each second, third, fourth etc. datum in the list.

Alternatively, the step width may also represent a letter position in a word (e.g. town names). For example, in the case of a "normal" step width, the fifth letter in the town name can be changed by a rotational movement. If the user then reduces the distance in relation to the reference position, i.e. increases the step width, the fourth letter in the town name is changed. In the case of the maximum step width, the first letter of the town name is changed. The user can thus very rapidly change from a town having an initial letter A to a town having an initial letter M. By reduction of the step width, the user can then "turn" through the town names having the letters M, until the desired town name has been selected.

FIG. 4A additionally shows a further implementation possibility. For this, an optional arc segment 440 is represented on the display device 130. Such an arc segment 440 may be displayed, for example, above a data selection field or input field. The arc segment 440 may be displayed, for example, by tapping or selecting the field 410.

The user then has the possibility of selecting data for the field 410 by using a finger or an object to effect a touch inside the arc segment 440. The reference position 430 may be inside the data selection field 410. Alternatively, the reference position 430 may also be determined by the boundary lines of the arc segment 440, which each lie on a radius of the arc segment. In each case, therefore, the user has a visual indication of where the reference position 430 is located. Moreover, the user does not need to use two fingers or two objects to touch the touch-sensitive surface 120 in order to effect the input.

In a further implementation possibility of the present disclosure, the reference position need not be a permanently fixed point, i.e. it need not be a point that assumes a fixed position during the entire data selection operation. For example, the user may select data using two fingers. In this case, a first finger is placed on a reference position, while a second finger executes the movement from the first touch position to a second touch position. Following the movement of the touch position, the end of the touch-sensitive surface may then be reached, but with the data selection not yet completed. In this case, the user moves the finger that initially defined the reference position. In this case, the hitherto second touch position becomes the (fixed) new reference position. This enables the user to go through a very large amount of data before selecting a particular datum. The surface or area of the touch-sensitive surface 120 can be utilized in a particularly advantageous manner in this case.

Moreover, the present process, or the implemented algorithm, requires only marginal adjustment. It is only necessary for the processor system 110 to sense which touch is moving and which touch is stationary. The geometric parameter can then assume positive or negative values in the usual manner, owing to the movement in the clockwise or anti-clockwise direction. If the reference position is changed, the intuitive direction of movement remains the same for the user. For right-handed persons, for example, these are positive values for movements in the anti-clockwise direction.

Alternatively, it is even possible to dispense with a fixed reference position. In this case, the user can effect a movement using each of two fingers. The reference position is then either one of the two moving touch positions or a position fixed by the processor system.

Setting of the direction in which values are changed positively or negatively may be preset and/or adjusted through user option settings.

Finally, an implementation of the present disclosure provides that the processor system 110 displays the reference position on the display 130. This is realized by a particular symbol on the display 130. The symbol may be a dot, a cross or a similar indicator.

The processor system 110 is additionally able to display a movement trace on the display device 130. Such a movement trace is represented, for example, as the movement 420 in FIG. 4A. Touch positions at which the user pauses may be is represented by a dot or other indicator, while the movement in-between is represented as a green line. As an alternative to this, the movement trace is displayed only for a predefined time period (e.g. 0.5 s to 2 s, preferably 1 s). After this period, the oldest part of the movement trace is faded.

The form of data selection described above in some implementations has the advantage that the user can perform both the data selection itself and setting of the step width by using one movement sequence. This can also be effected in a single movement. The technique of the present disclosure makes it possible for the user to achieve easy operation and rapid data selection while, at the same time, requiring only a small amount of space on the touch-sensitive surface.

The invention claimed is:

1. A computer-implemented method for data selection by means of a touch-sensitive surface, the method comprising:
sensing a first touch position on the touch-sensitive surface;
tracking a movement from the first touch position to a second touch position;
calculating at least one geometric parameter from the first touch position, the second touch position and a reference position; and
effecting a data selection within a data range in dependence on the geometric parameter,
wherein calculating of the at least one geometric parameter comprises:
calculating a first distance from the reference position to the first touch position, and a second distance from the reference position to the second touch position; and
calculating a relationship between the first distance and the second distance, wherein calculating of the relationship comprises calculating a difference between the first distance and the second distance,
wherein the method further comprises:
setting a step width in dependence on the calculated relationship of the first distance and the second distance,
wherein the data selection is effected with the set step width being taken into account, and
wherein the setting of the step width comprises:
determining whether the difference of the distances produces a positive or a negative value; and
changing the step width in dependence on the positive or negative value of the difference.

2. The method according to claim 1, wherein calculating of the at least one geometric parameter comprises calculating at least one distance measure between the first touch position and the second touch position, taking account of the reference position.

3. The method according to claim 2, wherein the at least one distance measure comprises at least one of the following: an angle between two connecting lines, of which a first runs from the reference position to the first touch position, and a second runs from the reference position to the second touch position, and an arc length between the first touch position and the second touch position, the reference position being a mid-point of an arc on which the arc length is based.

4. The method according to claim 3, wherein the data selection is effected in dependence on at least one of the angle and the arc length.

5. The method according to claim 1, wherein calculating of the at least one geometric parameter comprises calculating at least one geometric quantity of a circle sector or of an element thereof, the reference position being a mid-point of the circle sector.

6. The method according to claim 1, wherein the tracking of the movement and the calculating of the geometric parameter are performed at predefined time intervals, and the method additionally comprising:
  determining a difference between a currently calculated geometric parameter and a previously calculated geometric parameter; and
  comparing the difference with a threshold value,
  the data selection being performed only if the difference exceeds the threshold value.

7. The method according to claim 1, wherein the method comprises:
  determining the reference position by at least one of:
    determining a fixed point in respect of the first touch position and/or the second touch position;
    determining a fixed point in respect of an object represented on a graphical user interface;
    determining a third touch position on the touch-sensitive surface; and
    determining a movement mid-point, around which the tracked movement has its course.

8. The method according to claim 7, wherein the fixed point is located in an input field for data input.

9. The method according to claim 1, wherein the sensing of the first touch position and the tracking of the movement are limited to an area of an arc segment displayed on a graphical user interface.

10. The method according to claim 1, wherein the reference position is a third touch position, and the method additionally comprising:
  tracking a movement of the touch at the third touch position to a fourth touch position, while the touch at the second touch position remains stationary;
  calculating at least one further geometric parameter from the third touch position, the fourth touch position and the second touch position, as a new reference position; and
  effecting a further data selection within a data range in dependence on the further geometric parameter.

11. The method according to claim 1, wherein the data selection comprises:
  displaying a start datum;
  changing the start datum in dependence on the geometric parameter; and
  displaying the changed start datum.

12. A non-transitory computer-readable medium encoded with a computer program for performing the method according to claim 1, when the computer program is executed on a computer device.

13. A system for data selection, the system comprising:
  a touch-sensitive surface; and
  a processor system, which is configured to execute the method according to claim 1.

14. The system according to claim 13, further comprising:
  a display device, which is configured to display at least one of the datum or data, an input field for the datum or data, an arc segment, a display field of a set step width and a movement trace of the tracked movement.

15. The system according to claim 14, wherein the display device and the touch-sensitive surface are integrated in a touch-sensitive screen.

\* \* \* \* \*